United States Patent Office 2,958,420
Patented Nov. 1, 1960

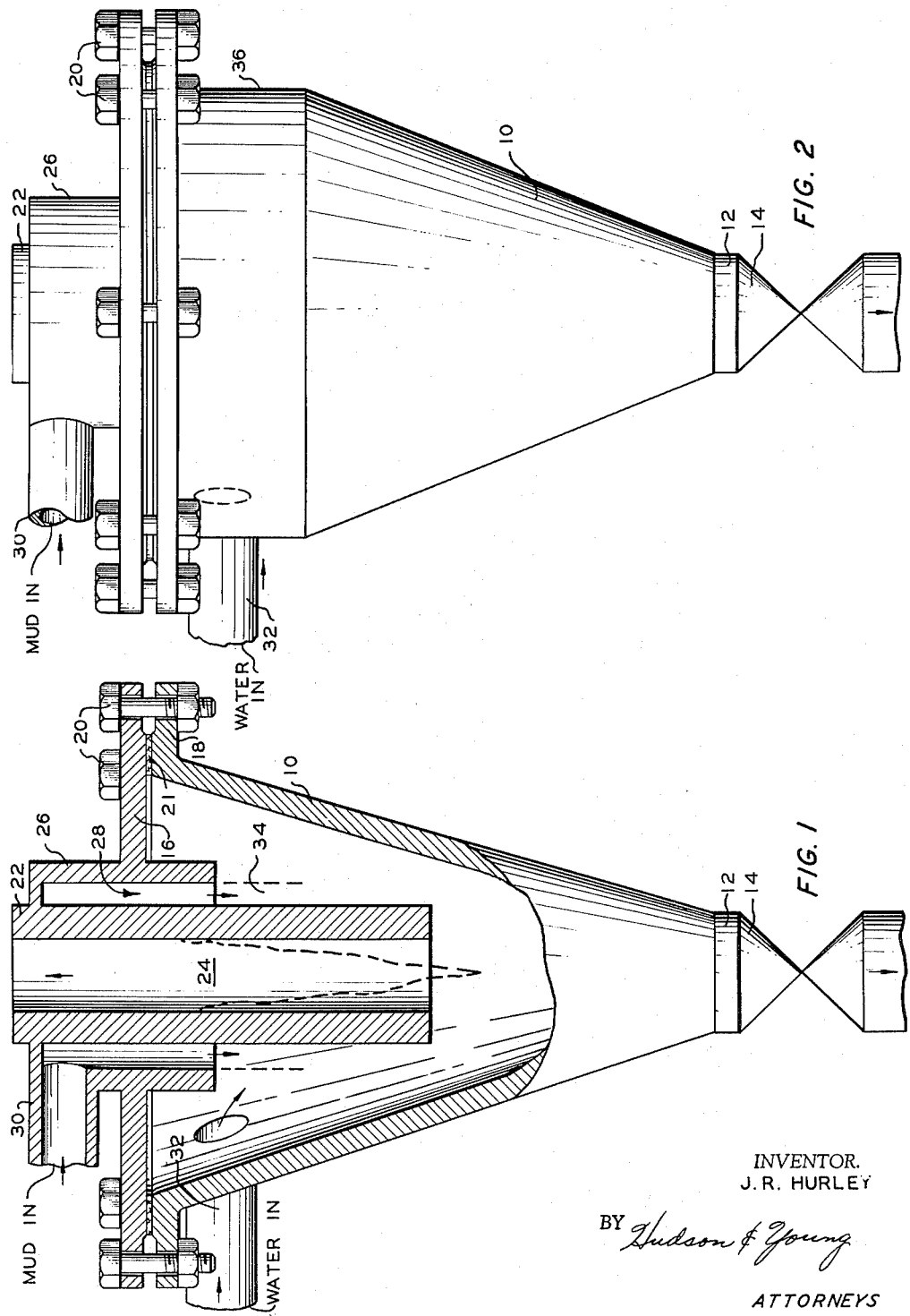

2,958,420

HYDROCYCLONE AND PROCESS

James R. Hurley, Bartlesville, Okla., assignor to Phillips Petroleum Company, a corporation of Delaware Filed May 27, 1957, Ser. No. 661,640

5 Claims. (Cl. 209—211)

This invention relates to a process and apparatus for classifying particulate solids of varying sizes in suspension in a liquid or slurry. A specific aspect of the invention relates to the separation of larger, heavier cuttings or particles from an aqueous drilling mud circulating from a rotary drilling process in an earth borehole.

The invention is concerned with an improved hydrocyclone. This type of apparatus is utilized in the treatment of ores, coal, and drilling muds utilized in rotary drilling in search of oil. The term "hydrocyclone" as used herein connotes an apparatus comprising a circular vessel tapered toward one end, termed the apex, and having one or more feed passages leading tangentially into the other end portion of the vessel, called the base, and having opposed axial discharge apertures, one at the apex and the other at the base. The base outlet or discharge aperture is thru a tubular member or conduit called a vortex finder extending into the hydrocyclone vessel a substantial proportion of the length of the vessel. The discharge aperture in the base is usually termed the overflow aperture, while the apex aperture is considered the underflow aperture. Thus far the description of the hydrocyclone is one of conventional structure. The present invention comprises a modification of this conventional hydrocyclone which results in several advantages and improvements in operation which will hereinafter be enumerated.

In the rotary drilling of an earth borehole, usually in the pursuit of oil, a drilling fluid or mud is circulated thru the hollow drill string and thru conduits in the drill bit and then thru the annulus to the mud pits or the circulation may be reversed. Clays and various weighting materials are utilized in drilling mud which is usually a suspension of these materials in water together with various other additives. In some instances oil is used in the drilling fluid. Cuttings from the borehole are circulated in the fluid out of the borehole and it is desirable to remove the heavier cutings from the mud before recirculating it to the borehole. It is conventional to use a hydrocyclone for this purpose but this device, as conventionally constructed, behaves as a thickener in that any large particles which become concentrated in the sludge stream discharged from the apex of the cyclone are dispersed in a phase which is at least as rich in small light particles as the original feed stream. In other words, conventional hydrocyclones concentrate large particles in the underflow or sludge but do not concentrate fines in the overflow as is desirable in order to conserve drilling mud additives.

In conventional practice the mud stream is injected into the cyclone tangentially at relatively high mud pressure and there is considerable wear on the mud pumps in supplying the required pressure and there is also considerable wear in the cyclone itself because of the abrasive action of the mud directly on the inner walls of the vessel. I have devised a process and hydrocyclone which substantially overcome or alleviate this problem.

Accordingly, it is an object of the invention to provide a process and apparatus for classifying particulate solids suspended in a liquid. Another object is to provide a process and apparatus for removing heavy cuttings from drilling mud more efficiently than heretofore possible. Another object is to provide an improved hydrocyclone separator. A further object is to provide a process and hydrocyclone for removing heavy particles from a slurry of particles of varying sizes which reduce wear on the cyclone. It is also an object of the invention to provide a process and hydrocyclone which require less power in the slurry or mud pumps than present separators require, thereby reducing the wear on the pumps. Other objects of the invention will become apparent from a consideration of the accompanying disclosure.

A conventional hydrocyclone separator when utilized in removing coarse particles from a suspension or slurry behaves as a thickener in that there is a high concentration of fines in the underflow or sludge and therefore there is insufficient classification of the particles in suspension in the overflow and in the underflow of the sludge. The hydrocyclone of the invention behaves as a classifier in that it produces a sludge having an increased concentration of large heavy particles, and also a decreased concentration of fine light particles as compared with their concentration in the feed to the separator. This effect is accomplished by injecting water tangentially thru the inlet port or ports of the device and injecting mud into the cyclone chamber axially thru an annular passage surrounding the overflow conduit or vortex finder. In this manner the water injected tangentially provides the motive power for the rotation of the liquid in the cyclone and provides a water layer contiguous to the wall of the cyclone, especially in the upper section thereof which protects the same from abrasive mud action. The mud particles which reach the sludge or underflow port at the apex of the cyclone are those which gravitate thru the water layer. Their size is sufficient to develop enough centrifugal force within the cyclone to force them thru the water layer. Flow rates of the water stream and of the mud stream are adjusted so that particles of a select size and finer do not remain in the separation zone long enough to reach the sludge and therefore are removed in the overflow thru the discharge conduit in the base.

Besides better particle separation and classification, my method of operating a hydrocyclone reduces the power required in the mud stream thereby obviating the high pressure mud pumps conventionally utilized in forcing the mud thru the hydrocyclone. It also greatly reduces the wear on the mud pump and also in the upper section of the hydrocyclone because of the greatly reduced mud pressure.

A more complete understanding of the invention is provided by reference to the accompanying schematic drawing of which Figure 1 is a partial axial section of a hydrocyclone constructed in accordance with the invention and Figure 2 is an elevation of another embodiment of a hydrocyclone of the invention.

Referring to Figure 1, a conical vessel 10 converges to an apex outlet conduit 12 in which is positioned a flow control device 14. The base of the conical vessel is closed by cover 16 which is attached to flange 18 of vessel 10 by means of bolts 20. A gasket 21 is provided as a seal between vessel 10 and cover 16. An axial conduit 22 extends well into the conical vessel providing a vortex finder therein and an overflow passageway 24. A concentric conduit 26 enclosing a section of conduit 22 and providing an annular passageway 28 extends thru cover 16 and terminates opposite an intermediate section of conduit 22. Mud inlet conduit 30 leads into annular passageway 28 within conduit 26 so as to provide axial injection of mud into the cyclone. A conduit 32 enters vessel 10 tangentially thereto at substantially the level of the lower end of conduit 26, although this tangential conduit may be positioned at a lower level than the end of conduit 16, it being essential that injected water apply rotational force to the mud stream. Of course, a plurality of conduits 32 may be utilized to introduce streams of water for imparting spiral flow to the liquid within the cyclone and particularly to the slurry entering the vessel from passageway 28 as at 34.

In Figure 2, the arrangement is similar to that of Figure 1 with the exception of the short cylindrical section 36 on the base of the conical section. The operation of this hydrocyclone is similar to that of Figure 1.

In operation of the hydrocyclone, mud is injected thru line 30 and annular passageway 28 so as to introduce the mud axially along the vortex finders 22. Injection of water thru one or more conduits 32 tangentially with respect to the conical vessel and the mud stream imparts a spiral and rotary movement to the mud annulus and the rate of rotation of the liquid within the vessel is dependent upon the relative rates of flow of the mud and water. These rates can be adjusted so as to provide the desired separation of cuttings from the mud stream or of any coarse particles from a stream of particles of mixed sizes, from a determination of the concentration of coarse particles in the underflow and of fine particles in the overflow. The rotation of the liquid mass within the cyclone establishes a vortex below the end to conduit 22 and creates a partial vacuum within passageway 24 so that the overflow passes thru this conduit in a relatively thin layer contiguous to the wall thereof. The finer particles in the slurry fed to the device are concentrated in the overflow and pass to the mud pits for recirculation thru the borehole.

In general, the action of the hydrocyclone of the invention is similar in many respects to that of a conventional hydrocyclone with the exception of the axial injection of the slurry feed and tangential injection of water to establish and maintain the rotating action of the liquid within the cyclone. Another distinction lies in the fact that the water injected thru line 32 protects the inner wall of the vessel, particularly in the upper section thereof, from mud abrasion.

In operation, the water injected tangentially is fed into the cyclone under a pressure in the range of 25 to 125 pounds per square inch, and even higher, while the mud pressure varies from just above atmospheric to about 100 pounds per square inch in a three inch diameter hydrocyclone. In this type of device the total flow ranges from 15 to 40 gallons per minute.

Because of water loss in the borehole, it is usually essential to introduce additional water to the drilling fluid and injection of water tangentially provides a method of introducing water to the drilling fluid up to the amount required for replacement of lost water. It is generally preferred to introduce not more than the required amount of water for bringing the mud up to the desired consistency.

Hydrocyclones of three and four inch diameter have been tested and have been found to be effective in separating coarse cuttings from aqueous drilling muds. Typical operation with a three inch cyclone using a weighted mud for the recovery of barytes is the following: mud input rate 10.6 gallons per minute, mud density of 14 pounds per gal., mud stream pressure of 30 p.s.i.g., water rate of 20.1 gallons per minute, water pressure of 114 p.s.i.g., overflow rate of 27.7 gallons per minute, overflow density of 9.2 pounds per gallon, sludge flow rate of 3 gallons per minute, sludge density of 21.0 pounds per gallon, solids in feed 61.5 weight percent barytes (balance being clay), and mud solids amounting to about 28 volume percent of the aqueous mud.

The above conditions and operation are merely illustrative, it being understood that variations in the same are within the scope of the invention. Likewise, variations in the structure of the separator may be made without departing from the invention.

I claim:

1. A process for separating a drilling mud comprising an aqueous slurry containing solid particles of a range of sizes into a first liquid stream of higher concentration of heavier particles and a second liquid stream of higher concentration of lighter particles, comprising pumping under a pressure from just above atmospheric to 100 p.s.i. an annular stream of said slurry downwardly into an inverted conical separation zone concentric with the axis thereof; simultaneously injecting an aqueous stream free of solids tangentially into an upper section of said zone at a pressure in the range of 25 to 125 p.s.i. so as to contact said annular stream and establish spiral flow of both streams toward an apex outlet, thereby setting up centrifugal forces within the liquid streams which displace heavier particles toward the outer periphery of said zone; withdrawing, as said first stream, an apex stream containing a high concentration of heavier particles; and withdrawing, as said second stream, a stream axially thru the upper end of said zone and inside of said annular stream containing a high concentration of lighter particles.

2. A process for classifying a drilling mud comprising an aqueous slurry of solids of diverse particle size into a first stream of high concentration of large size particles and a second stream of high concentration of small size particles, comprising establishing and maintaining a rotating body of said slurry in an inverted conical zone by pumping said slurry into the base of said zone at a pressure from just above atmospheric to 100 p.s.i. in an annular stream extending into said zone a substantial distance and surrounding an enclosed outlet passageway thru said base and injecting under substantial pressure a stream of water free of solids tangentially and laterally into said zone at substantially the level of the delivery of said slurry thereto adjacent said base, thereby directly applying a rotational force to said annular stream which causes larger particles to concentrate in the outer area of the rotating liquid and smaller particles in the inner area thereof; withdrawing a liquid stream of larger particles from the apex as said first stream; and withdrawing a liquid overflow stream of smaller particles from said outlet passageway as said second stream.

3. A hydrocyclone separator comprising in combination a vessel having an inverted conical bottom section terminating in an outlet at its apex; a single closure member covering the top of said vessel; an axial outlet conduit, and means for injecting drilling mud comprising a concentric annular injection conduit extending through said closure member both upwardly and downwardly therefrom to a level adjacent the top of said conical section, said outlet conduit extending farther into said vessel than said injection conduit to form a vortex finder therein; an annular closure member on the outer end of said annular injection conduit surrounding said outlet conduit; an inlet conduit leading laterally into said annular injection conduit; and a second injection conduit tangential to said vessel adjacent the level of the lower end of said annular injection conduit and substantially above the lower end of said outlet conduit, said second injection conduit being adapted to establish spiral movement of liquid injected therethrough so as to act on the slurry of solids introduced through said annular injection conduit, the extension of said annular injection conduit outside of said vessel adding length and volume to the spiraling annular column of said slurry entering said vessel.

4. The process of claim 2 including controlling flow rates of the mud and water streams so as to control the concentration of large particles in the apex stream and the concentration of small particles in the overflow stream.

5. The process of claim 2 wherein the water injected is not more than the amount required to restore the operating concentration of water in the original mud.

References Cited in the file of this patent

UNITED STATES PATENTS

| | | |
|---|---|---|
| 2,098,608 | Berges | Nov. 9, 1937 |
| 2,543,689 | Driessen | Feb. 27, 1951 |
| 2,723,750 | Pickens et al. | Nov. 15, 1955 |
| 2,756,878 | Herkenhoff | July 31, 1956 |
| 2,783,887 | Chisholm | Mar. 5, 1957 |

FOREIGN PATENTS

| | | |
|---|---|---|
| 536,348 | Canada | Jan. 29, 1957 |